T. STIBBS.
SKEIN-TWISTING MACHINE.
No. 184,309. Patented Nov. 14, 1876.
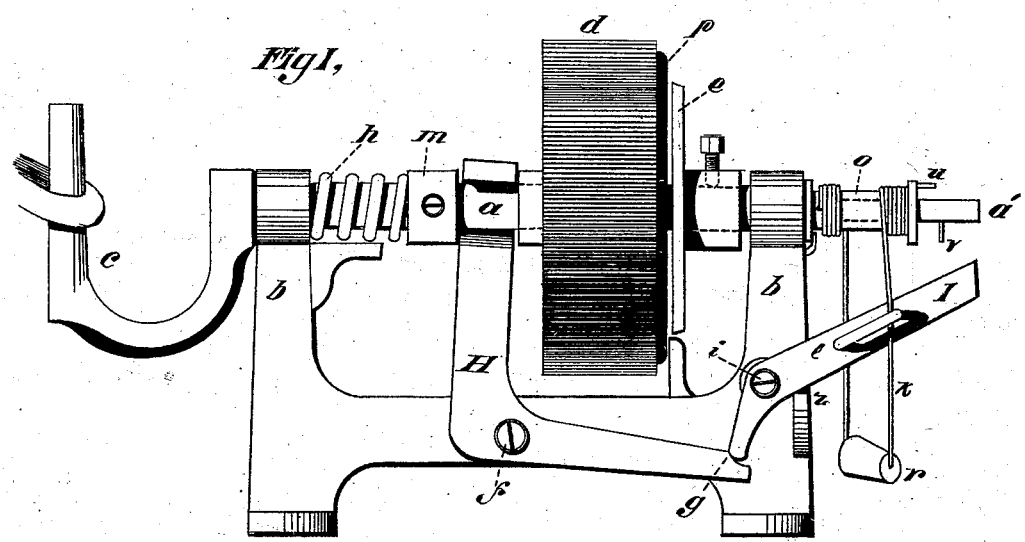
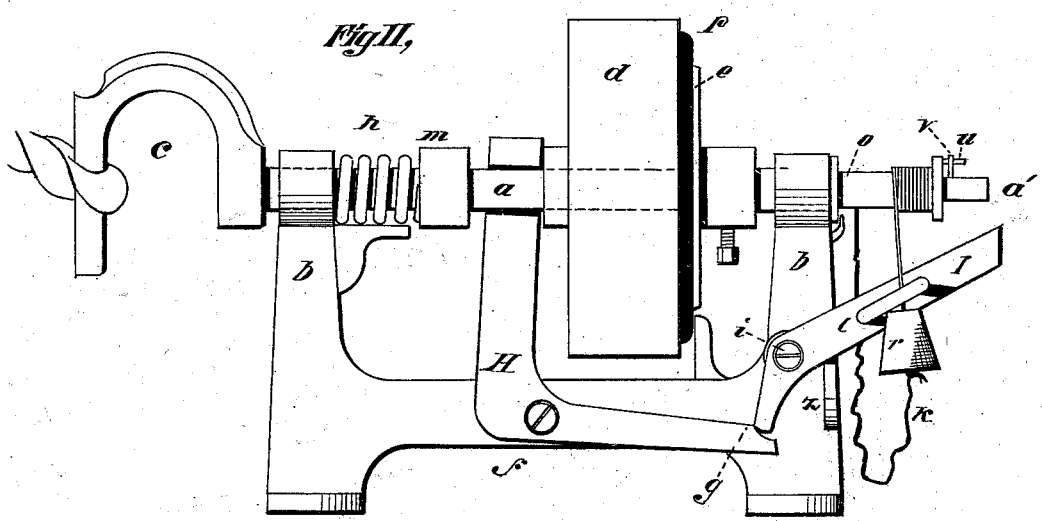

UNITED STATES PATENT OFFICE.

THOMAS STIBBS, OF WOOSTER, OHIO.

IMPROVEMENT IN SKEIN-TWISTING MACHINES.

Specification forming part of Letters Patent No. 184,309, dated November 14, 1876; application filed August 24, 1876.

*To all whom it may concern:*

Be it known that I, THOMAS STIBBS, of Wooster, Wayne county, State of Ohio, have invented an Improvement in Skein-Twisting Machines, of which the following is a specification:

My invention consists more particularly of improvements upon the machine for which Letters Patent were granted me No. 117,218, of July 18, 1871, in which the pull given to a skein of yarn having a bight upon a hook, brought a clutch upon a shaft, of which the hook was a terminal, into contact with a loose pulley upon the same shaft, to impart revolution to it, to twist the skein; and my improvements now consist in the addition of mechanism whereby the machine is made to determine automatically (with capability of adjustment) the number of twists to be given to the skein, so that when the desired number of twists are given the revolution of the operative hook is let off.

In the drawings, Figure I is a partial longitudinal section of the machine, having its parts in one position, and Fig. II is a longitudinal view, showing the same in another position.

Referring to the drawings, $a$ is the shaft; $b\ b$, the standards which support it; $c$, the hook on its end; $d$, the pulley placed loosely on it and kept in rotation by independent belting; $e$, a friction-clutch fixed on the shaft, and which, at the proper time, engages with the side of the pulley which is provided with a leather or other friction surface, $p$; $h$, a spiral spring surrounding the shaft, and placed between the collar $m$ of the shaft and the standard-bearing next the hook, and pressing the clutch away from the pulley; and H is an angle-lever, one end of which is interposed between the collar $m$ and the hub of the loose pulley, and which, when fixed as shown in Fig. I, prevents the pulley from escaping the clutch drawn against it.

Viewing this fixed lever as a limit to any lateral movement to the loose pulley upon the shaft, and as taking the place of one standard for that purpose in the device formerly patented, the parts above mentioned are not new, and, as in my old patent, a pull upon the hook would cause motion to be imparted to it while such pull continued. But that the shaft carrying the yarn-hook may be made to cease revolving when the skein has received the desired number of twists, I release the operating-pulley from its clutch as follows: The lever H, hinged to the frame at $f$, has its end at $g$ locked by the lever I hinged at $i$, so that the longer arm, by its weight resting on the stud $z$ from the frame, brings its shorter arm to lock the end of lever H, to cause it, as before mentioned, to resist any tendency of the pulley to leave its clutch.

The shaft $a$ is prolonged outside of its standard-bearing to form the spindle $a'$, upon which is placed the spool $o$, and from this spool passes the cord $k$ through the staple $l$ in lever I, and is provided below the staple with the weight $r$. The spool, which is loose on the spindle, though held to the standard, is clutched by the spindle by the same movement of the shaft that clutches the pulley $d$ through the pins $u\ v$, respectively, upon the rim of the spool and upon the spindle.

In operation, the skein being passed over the hook $c$ and pulled, the clutch $e$ is brought against the pulley $d$, and the pulley, being held between the clutch and the fixed lever H, imparts its motion to the shaft $a$ with its spindle $a'$. The same motion that brings the clutch against the pulley also causes the spool to be clutched to the spindle, and the revolution of the shaft commences to wind up the cord, which, when it brings the weight against the lever I, lifts up its long arm and unlocks the lever H, which, being now free, permits the pulley to leave the clutch in the direction of the collar $m$.

The friction of the spring $h$ against collar $m$ is sufficient to at once overcome any momentum possessed by the shaft $a$ when no longer driven by the pulley; and it will be seen that when the yarn has received the set number of twists, the hook is stopped automatically, while the number of twists to be given by the hook is directly regulated and determined by the length given to the cord tripping the lever, and the weight-releasing lever I resumes its position at the bottom of the cord when the spool is unclutched.

Now, having described my invention, what I claim is—

In skein-twisting machines, the combination, with the hook-shaft $a$, having the loose pulley $d$ and friction-clutch $e$, of automatic stop mechanism brought in operation by the revolution of the shaft through the spool and cord thereon, to release the pulley and determine, by the length of the cord, the number of twists to be given the skein, substantially as and for the purposes shown and set forth.

THOMAS STIBBS.

Witnesses:
ANNIE WILSON,
W. P. STIBBS.